Nov. 2, 1971  P. MOLLARD  3,616,837
FLUIDIZED BED PROCESS FOR OBTAINING GRANULATED BORIC OXIDE
Filed Oct. 16, 1969
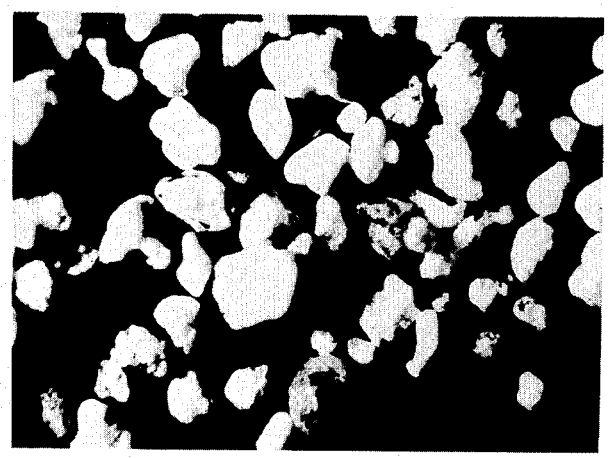
INVENTOR.
Paul Mollard
BY
Webb, Burden, Robinson & Webb
HIS ATTORNEYS

United States Patent Office 3,616,837
Patented Nov. 2, 1971

3,616,837
FLUIDIZED BED PROCESS FOR OBTAINING
GRANULATED BORIC OXIDE
Paul Mollard, Ste-Foy les Lyon, France, assignor to
Ugine Kuhlmann, Paris, France
Filed Oct. 16, 1969, Ser. No. 867,013
Claims priority, application France, Oct. 17, 1968,
170,199
Int. Cl. B01d 1/00; B01l; B01j; F26b 7/00; C01b 15/12
U.S. Cl. 159—47                                  3 Claims

ABSTRACT OF THE DISCLOSURE

A process for obtaining granulated boric oxide by the dehydration of granulated boric acid comprising placing the granulated boric acid on a diffusion device such as a porous plate and passing a hot air stream through the device to form a fluidized bed. The hot air stream should have sufficient speed to insure an expansion of the fluidized bed to 150 percent of the volume of the bed at rest.

My invention relates to the preparation of granulated boric oxide by the dehydration of boric acid.

It is well-known that a mere heating enables one to dehydrate boric acid ($B_2O_3 \cdot 3H_2O$) to form boric oxide ($B_2O_3$). But the industrial application of this very simple reaction encounters many difficulties, resulting from the fact that the product during drying undergoes a pasty melting at about 150° C. A vitrified mass is obtained during cooling and this mass must then be crushed. In addition, the pasty product is very corrosive and cannot be processed in steel vessels. Although refractory products and the special alloys are affected to a lesser extent than steel by the pasty material, there is generally enough of an attack to bring impurities into the final product. Lastly, in order to have a sufficient dehydration speed, one hour for instance, it is necessary to raise the temperature up to 600–800° C.

In order to avoid these drawbacks, attempts have been made to operate under vacuum. When operating at 160° C., the dehydration takes place in 6 to 8 hours, but again a vitrified mass is obtained. When operating at about 100° C., the caking is avoided, but the operation lasts about 20 hours. The use of the vacuum does not enable one to obtain a granulated product or employ a process of short duration.

It has also been proposed to operate in an air stream, for instance in a turning oven. But it still has not been determined how to avoid the caking of the product.

I have found that the granulated boric acid can be dehydrated within a time which is industrially acceptable by means of heated air at a temperature at least equal to the pasty melting temperature of the product, while at the same time avoiding caking, and further constantly maintaining the end product in a granulated form. The resulting grains have a density between 0.4 and 0.5. In addition they are highly porous, very soluble and endowed with a high reactivity.

According to my invention the granulated boric acid is placed above a diffusion device, for instance a porous plate through which a stream of hot air is passed to form a fluidized bed. This stream of hot air is introduced at a speed that ensures an expansion of the fluidized bed to at least 150 percent and preferably 200 percent, of its volume at rest.

I have noted that under these stirring conditions, the grains do not adhere to one another or against the walls or against the porous plate, even though they reach a temperature in which they are in a state of pasty melting. The speed of the air stream necessary to obtain the desired expansion which characterizes the process depends on the size of the starting grains which size is substantially maintained during the dehydration. As an indication, for grains having an average size of 0.4 mm. and individual sizes comprised between 0.2 and 0.8 mm., an air speed of 0.08 m./s. is suitable. This air speed is calculated under normal conditions of temperature and pressure for an empty holder.

In order to obtain a practically anhydrous oxide, the fluidization air must be between 200 and 250° C. at the end of the operation. But at the beginning of the operation, it is preferred to operate with air at lower temperatures, such as 150 or 160° C.

The temperature of the product itself progressively increases as water goes out. Because of the expansion of the fluidized bed, no caking of the product is observed, even though the composition passes through a state of pasty melting at the operating temperature. One explanation for the absence of a progressive caking of the product is that the rapid stirring on the product results in little time for actual contact of the grains among themselves and with the walls. Another explanation is that the superficial zone of each grain is very quickly brought to a dehydration state exceeding the one within which the substance may be subjected to the pasty melting. Therefore, the grain would have a porous and dehydrated external zone, the thickness of which would progressively spread toward the grain center. The existence of this external porous layer is in accordance with the final composition of the grains obtained by operating according to my process.

In order to demonstrate the solubility advantages of the grains produced by my process, granulated boric acid, having a grain size between 0.2 and 0.8 mm. and boric oxide obtained from identical grains by my invention were dissolved in pure water at 26° C. in quantities above the solubility of boric acid in water. After a contact of 2, 5, 10 minutes, the filtrates were filtered and analyzed. In each instance the concentration of boric acid was greater when boric oxide made according to my invention was used, as shown by the following table.

|  | Concentration of the filtrates in $BO_3H_3$ | | |
|---|---|---|---|
| Time in minutes | 2 | 5 | 10 |
| Boric oxide according to my invention | 57 | 56.9 | 57.3 |
| Boric acid | 46.5 | 46.8 | 47.3 |

The high reactivity of the product obtained according to my invention was shown by introducing the product, while stirring, into a sodium hydroxide solution at 50 percent by weight. The amounts of boric oxide and NaOH were in stoichiometric quantities as represented by the following equation:

$$2NaOH + B_2O_3 \rightarrow 2NaBO_2 + H_2O$$

The dissolving of the boric oxide obtained according to my invention was complete within 10 minutes. The temperature increased to about 90° C. and the dissolving was accompanied by a slight evaporation. The solution became pasty and then a solid concentrated metaborate was formed, $NaBO_2 \cdot 2.45H_2O$.

In the following examples which illustrate my process, I employed a cylindrical apparatus 200 mm. inner diameter fitted with a porous plate, above which the product was placed. The product had a granulometry between 0.2 and 08 mm., the average size being 0.4 mm. A hot air stream, whose speed was 0.8 m./s. calculated at 0° C. and under 760 mm./Hg was then passed through the porous plate and the product.

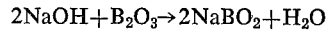

EXAMPLE 1

The temperature of the air stream was maintained at 160° C. for one hour and a half, i.e., at a temperature above the temperature of pasty melting of the product. At the end of this time, the average composition of the product was 87 percent $B_2O_3$ and 13 percent $H_2O$, i.e., about $B_2O_3 \cdot 0.5H_2O$. The temperature of the gas was then raised to 205° C. The average temperature of the solid quickly rose to 160–175° C., and after one hour reached 200° C. Afterwards this 200° C. temperature was maintained. The product had the composition 97.5 percent $B_2O_3$ and 2.5 percent $H_2O$. The density of the product was 0.44 g./cm.$^3$.

EXAMPLE 2

The temperature of the air stream was maintained at 162° C. for 15 minutes. The composition of the product was 77 percent $B_2O_3$ and 23 percent $H_2O$, i.e., $B_2O_3 \cdot H_2O$. The temperature of the hot air was then raised to 200° C. for 78 minutes. The product which was taken at this moment titrated 96 percent $B_2O_3$ and 4 percent $H_2O$. Then by raising the air temperature to 245° C. for 40 minutes, a product was obtained having the composition 98 percent $B_2O_3$ and 2 percent $H_2O$. The density of the product was 0.45 g./cm.$^3$.

EXAMPLE 3

I took a mixture of 50 percent of boric acid and 50 percent of the product obtained in Example 2 and treated it for 1 hour with the air at 150° C. The resultant product titrated about 65 percent $B_2O_3$ and 15 percent $H_2O$. Then the air temperature was raised to 250° C. for 1 hour and the resultant product titrated 97.4 percent $B_2O_3$ and 2.6 percent $H_2O$. The density was 0.45 g./cm.$^3$.

The annexed photograph, enlarged 23 times, shows the rounded general form of the grains and of the apparent pores. The specific gravity measured according to the Pycnometer method is 1.5 whereas the values generally admitted are 1.81 for vitreous $B_2O_3$ and 2.26 for crystallized $B_2O_3$. The value 1.5 shows that the product according to the invention is porous; however the pores are not microporous since the specific surface measured according to the BET method is less than 0.1 $M^2/g$. The real specific gravity must not be mistaken for the density by volume of the products according to the invention. Said density by volume lies between 0.4 and 0.5, say it is comprised between 0.4 and 0.5 g./cm.$^3$.

I claim:
1. A process for obtaining granulated boric oxide by the dehydration of granulated boric acid comprising:
    (A) placing granulated boric acid on a diffusion device within a vessel,
    (B) passing a hot air stream through the diffusion device to form a fluidized bed, the hot air stream having sufficient speed when the mass reaches a temperature of 150° C. to insure an expansion of the fluidized bed to at least 150 percent of the volume of the fluidized bed at rest to insure non-tacking of the granules, the temperature of the hot air stream at the end of the process being between 200 and 250° C.

2. The process of claim 1 wherein the temperature of the hot air stream at the beginning of the process is about 150° C.

3. The process of claim 1 wherein the hot air stream expands the fluidized bed about 200 percent of the volume of the fluidized bed at rest.

References Cited

UNITED STATES PATENTS

| | | | |
|---|---|---|---|
| 137,072 | 3/1873 | Gutzkow | 23—149 |
| 160,761 | 3/1875 | Formhals | 23—149 |
| 2,545,746 | 3/1951 | O'Brien et al. | 23—149 |
| 2,635,684 | 4/1953 | Joscelyne | 34—10 |
| 2,857,244 | 10/1958 | Graves | 23—90 |
| 3,000,705 | 9/1961 | Juckniess | 23—149 |
| 3,339,618 | 9/1967 | Bowden et al. | 159—48 |

NORMAN YUDKOFF, Primary Examiner

J. SOFER, Assistant Examiner

U.S. Cl. X.R.

159—DIG. 3; 23—149, 293

UNITED STATES PATENT OFFICE
CERTIFICATE OF CORRECTION

Patent No. 3,616,837              Dated   November 2, 1971

Inventor(s)           Paul Mollard

It is certified that error appears in the above-identified patent and that said Letters Patent are hereby corrected as shown below:

Column 2, line 69, "08 mm." should read -- 0. 8 mm. --; line 70, "0. 8 m. /s." should read -- 0. 08 m. /s. --.

Signed and sealed this 9th day of May 1972.

(SEAL)
Attest:

EDWARD M. FLETCHER, JR.                ROBERT GOTTSCHALK
Attesting Officer                      Commissioner of Patents